April 24, 1951 R. P. DELANO, JR., ET AL 2,550,536
HIGH-PRESSURE BALL AND SOCKET PIPE JOINT
Filed June 19, 1947 2 Sheets-Sheet 1

Patented Apr. 24, 1951

2,550,536

UNITED STATES PATENT OFFICE 2,550,536

HIGH-PRESSURE BALL AND SOCKET PIPE JOINT

Raymond P. Delano, Jr., and Robert W. Gregson, Baltimore, Md., assignors, by mesne assignments, to Franklin Railway Supply Company, Wilmington, Del., a corporation of Delaware Application June 19, 1947, Serial No. 755,750

14 Claims. (Cl. 285—94)

This invention relates to flexible pipe connections and is particularly concerned with a ball and socket pipe joint.

It is a principal object of the invention to provide a ball and socket type of pipe joint of which the individual features and parts are so arranged as to enable the joint to withstand high pressures and temperatures, for instance pressures up to about 600 pounds per square inch and temperatures up to about 800° F.

In accomplishing the foregoing, the invention provides a joint in which the ball member is positively supported in the socket by a metallic bearing seat and metallic bearing shoes, rather than by packing material. The joint of the invention, however, also incorporates packing material, and in the preferred arrangement, separate spring means are utilized for maintaining the packing material tight and for maintaining the ball in engagement with its metallic bearing seat.

Because of the foregoing, the packing material of the joint is relieved of loads which might otherwse be transmitted thereto as a result of expansion of the pipe line or as a result of the weight of one part of the joint, where the joint is positioned so that one part supports the other.

Another feature of the joint of the invention is the arrangement of the several parts in a manner providing exceptionally easy and simple assembly, repacking or repair. The separable parts, moreover, are so arranged that the assembly and fastening of the parts cannot result in cramping of the packing or of the ball.

Still further, the invention provides for automatic adjustment of the several parts of the joint, including the packing, to compensate for wear.

The several parts of the joint are also arranged to permit manufacture by simple techniques, as will further appear.

The invention also provides for the use of replaceable wearing parts and for the proportioning of the ball of the joint so as to provide for turning it down to a new surface to compensate for wear.

Exceptional compactness is another characteristic of the joint of the present invention.

How the foregoing objects and advantages are attained will appear more fully from the following description referring to the accompanying drawings, in which.

Figure 1:
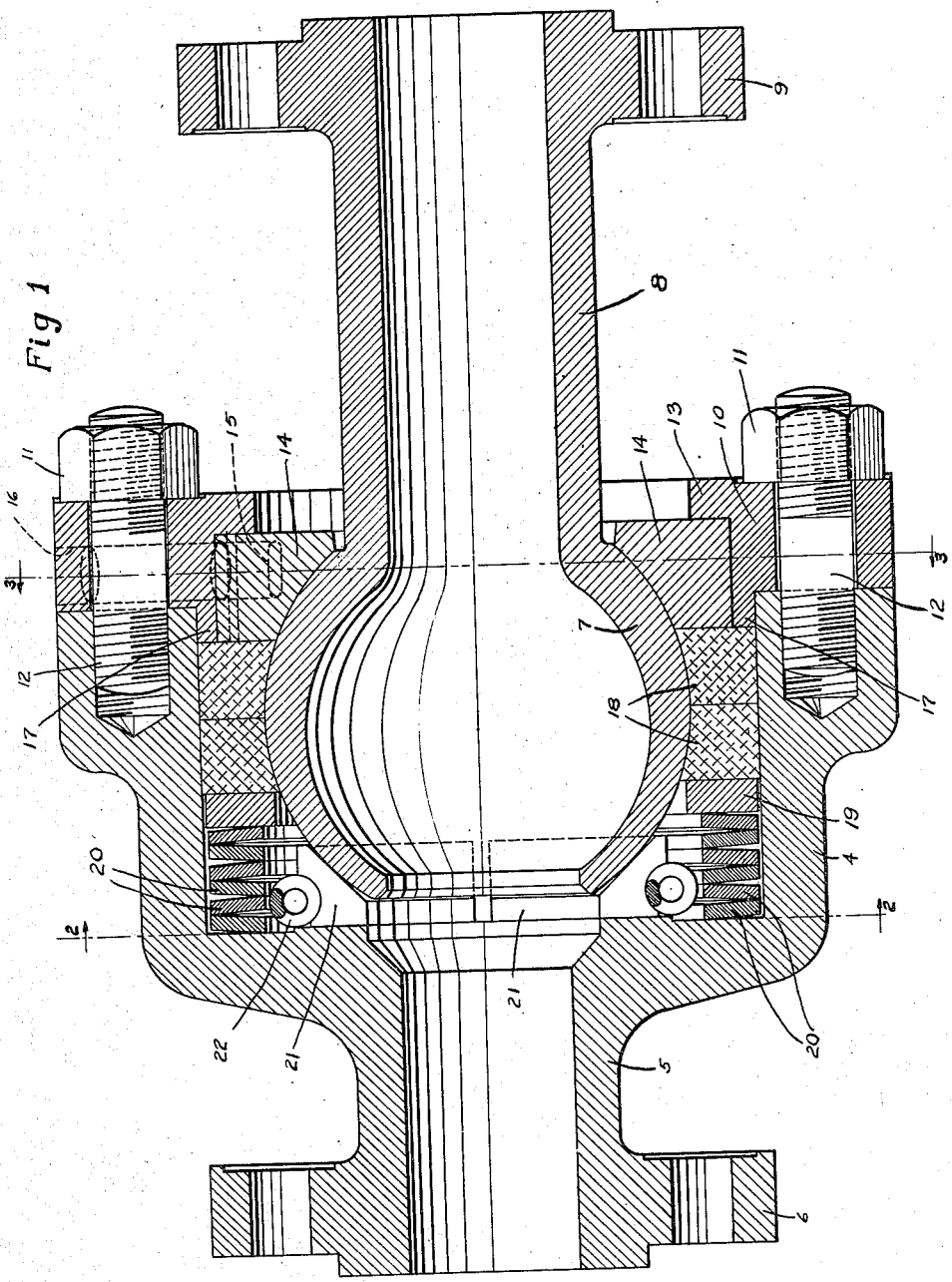
Figure 1 is an axial sectional view through a ball and socket pipe joint constructed according to the present invention.
Figure 2:
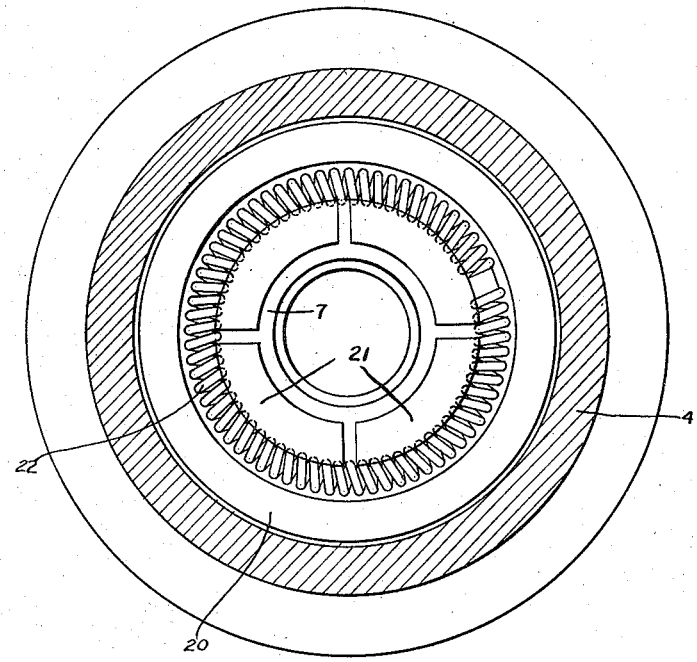
Figure 2 is a transverse sectional view taken as indicated by the section line 2—2 on Figure 1 but on a reduced scale.

According to the invention, a socket member 4 is provided, having a substantially cylindrical internal bore adapted to receive various other parts of the joint, as described below. The socket has a neck 5 provided with an apertured coupling flange 6. The other major part of the joint comprises the ball 7 which is arranged toward one end of the shank 8 having, at its other end, an apertured coupling flange 9.

Figure 3:
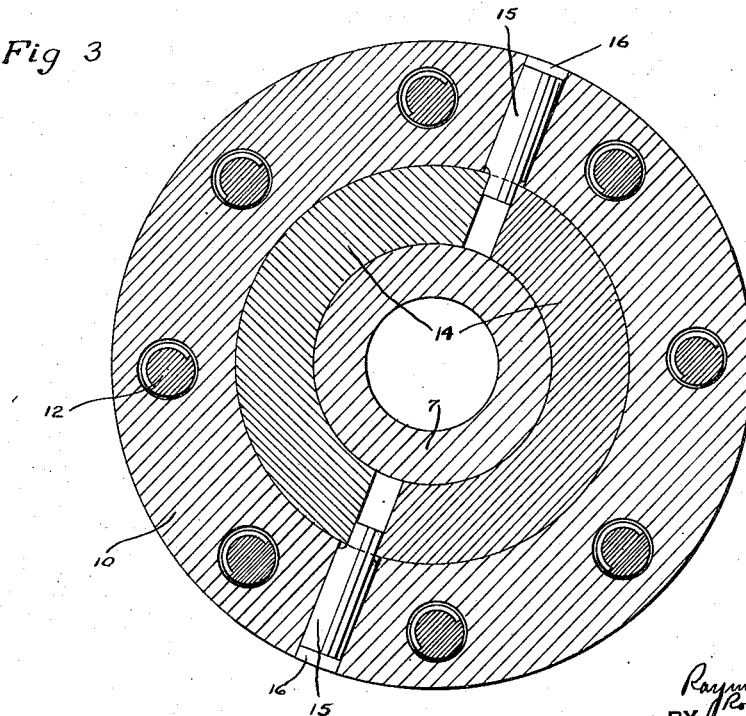
Figure 3 is a transverse sectional view taken as indicated by the section line 3—3 on Figure 1, also on a reduced scale.

A retaining ring 10 is adapted to be removably secured to the free edge of the socket member 4 by means of a series of nuts 11 cooperating with studs 12 which are threaded into the socket member 4. The ring 10 has an inturned flange 13, having an inside diameter somewhat greater than the overall diameter of the ball 7, so that this ring may be passed over the ball 7 in assembling the joint. Flange 13 also serves to seat and position the two-part seating ring 14—14. The parts of this ring are removable to provide for assembly and also for replacement to compensate for wear. The parts 14 of this ring, moreover, are restrained as against rotation in the retaining ring 10 by means of a pair of abutments 15—15, which are positioned in radial recesses 16—16 in the retaining ring 10, the inner ends of the abutments 15 projecting between the adjacent ends of the parts 14 of the seating ring, as clearly appears in Figure 3. The abutments 15 may be welded or otherwise secured in position.

As seen in Figure 1, the retaining ring 10 is shouldered to provide a lip 17 extended a short distance into the cylindrical bore in the socket member 4, to thereby accurately position the seating ring 14—14 with respect to the socket. A pair of packing rings 18—18 are interposed between the ball 7 and the socket 4, these rings preferably being of construction described hereinbelow. At one side, one of the packing rings abuts against the parts 14 of the seating ring and also against the inner edge of the lip 17. At the opposite side of the other packing ring 18, there is provided a flat ring 19 against which the spring for tightening the packing reacts. The packing spring comprises a Belleville spring, i. e., is made up of a stack of dished spring washers 20, as clearly appears in Figure 1.

For the purpose of retaining the ball 7 against its seat on the parts 14 of the seating ring, another ring is employed toward the opposite end of the bore, this ring being made up of a plurality of segments 21, which are urged radially inwardly by means of the garter spring 22, which is seated in external peripheral grooves formed in the segments 21. The segments 21 react between the ball itself and the base of the socket part of the joint, and since segments 21 are wedge-shaped in cross section, they serve to force the ball against its bearing seat on the seating ring 14.

From the above, it will be seen that separate springs are employed for the purpose of seating the ball and for the purpose of tightening the joint packing. It will also be observed that these two springs are nested one within the other, which makes for compactness of the joint.

Because of the arrangement of the multi-segment ring 21 (reacting between the ball and the end wall of the socket), adjustment of the seating pressure of the joint may readily be obtained by substituting segments 21 of slightly different wedge shape. Thus, with segments of a relatively small wedge angle, the seating pressure against the seating ring 14 is increased, even with a garter spring 22 of the same strength. The frictional engagement of the segments 21 with the end wall of the socket, provides great resistance to unseating of the ball from the ring 14, for instance under the influence of expansion of the connected pipe.

The joint, as a whole, may readily be taken apart and assembled. For purposes of assembly, the retaining ring 10 is first slipped over the ball 7 onto the shank 8. The parts 14 of the seating ring are then inserted into the retaining ring, and after assembly of the packing rings on the ball and proper positioning of the remaining parts in the socket, the two assemblies are brought together and the retaining ring fastened in place by the nuts 11. This fastening is utilized to properly tension the springs 20 and 22, so that in service they act to take up wear both at the seating ring and at the packing rings.

The packing rings are advantageously split and in order to withstand high pressures as well as high temperatures, they are advantageously formed of compacted aluminum foil, or some other material capable of withstanding the operating conditions to which the joint is subjected.

Further attention is called to the fact that the ball 7, especially in the region in which it is seated against the ring 14, is of relatively great thickness. It is contemplated that sufficient wall thickness be employed in this region of the ball to provide for turning the ball down to undersize in the event of development of irregular wear.

The several features above discussed not only provide a joint capable of withstanding high pressures and high temperatures, but at the same time contribute a number of other advantages, especially from the standpoint of assembly, maintenance, repair, and repacking.

We claim:

1. In a flexible pipe joint comprising a ball and a socket, a bearing seat in the socket adapted to engage the ball to relatively position the ball and socket, a packing ring adapted to provide a seal between the ball and socket, and separate springs serving respectively to retain the ball in engagement with said seat and to tighten the sealing ring.

2. In a flexible pipe joint comprising a ball and a socket, a bearing seat toward one end of the socket adapted to engage the ball to relatively position the ball and socket axially of the joint, and means for retaining the ball in engagement with said bearing seat comprising a multi-segment retaining ring in the socket toward the other end thereof and spring means acting to urge the segments of the retaining ring radially inwardly and thereby urge the ball against its bearing seat.

3. In a flexible pipe joint comprising a ball and a socket, a bearing seat toward one end of the socket adapted to engage the ball to relatively position the ball and socket axially of the joint, a packing ring between the ball and socket, a spring acting on the packing ring axially of the joint to tighten the seal, and means for retaining the ball in engagement with said bearing seat comprising a multi-segment retaining ring in the socket toward the other end thereof and spring means acting to urge the segments of the retaining ring radially inwardly and thereby urge the ball against its bearing seat.

4. In a flexible pipe joint comprising a ball and a socket, a bearing seat toward one end of the socket adapted to engage the ball to relatively position the ball and socket axially of the joint, and mechanism for retaining the ball in engagement with said bearing seat comprising a multi-segment ring toward the other end of the socket with the segments thereof of generally wedge-shaped cross section and positioned to react between a portion of the socket and the ball upon radially inward displacement of the said ring segments, and yielding means urging said segments radially inwardly.

5. A construction according to claim 4 in which said yielding means comprises a garter spring extended around said ring segments.

6. In a flexible pipe joint comprising a ball and a socket, a bearing seat toward one end of the socket adapted to engage the ball to relatively position the ball and socket axially of the joint, mechanism for retaining the ball in engagement with said seat comprising a multi-segment ring toward the other end of the socket adapted to bear against the ball to urge it against said seat, and packing between the ball and socket in a transverse plane intermediate said bearing seat and said multi-segment ring.

7. In a flexible pipe joint comprising a ball and a socket, a bearing seat toward one end of the socket adapted to engage the ball to relatively position the ball and socket axially of the joint, mechanism for retaining the ball in engagement with said seat comprising a multi-segment ring toward the other end of the socket adapted to bear against the ball to urge it against said seat, packing between the ball and socket in a transverse plane intermediate said bearing seat and said multi-segment ring, and annular spring means located around said multi-segment ring and reacting axially of the joint between the socket and the packing to tighten the latter.

8. In a flexible pipe joint comprising a ball and a socket, a bearing seat toward one end of the socket adapted to engage the ball to relatively position the ball and socket axially of the joint, mechanism for retaining the ball in engagement with said seat comprising a multi-segment ring toward the other end of the socket adapted to bear against the ball to urge it against said seat, packing between the ball and socket in a transverse plane intermediate said bearing seat and said multi-segment ring, and separate spring means acting, respectively, to tighten the packing and to urge the segments of said ring against the ball to retain the ball against said bearing seat.

9. In a flexible pipe joint comprising a ball and a socket, a bearing seat toward one end of the socket adapted to engage the ball to relatively position the ball and socket axially of the joint, mechanism for retaining the ball in engagement with said seat comprising a multi-segment ring toward the other end of the socket adapted to bear against the ball to urge it against said seat, packing between the ball and socket in a transverse plane intermediate said bearing seat and said multi-segment ring, spring means acting against the outer sides of the segments of said ring to urge the segments radially inwardly against the ball to retain the ball against said bearing seat, and spring means located radially outwardly of said first spring means and acting against the packing to tighten the same.

10. In a flexible pipe joint comprising a ball and a socket, a bearing seat toward one end of the socket adapted to engage the ball to relatively position the ball and socket axially of the joint, mechanism for retaining the ball in engagement with said seat comprising a multi-segment ring toward the other end of the socket adapted to bear against the ball to urge it against said seat, packing between the ball and socket in a transverse plane intermediate said bearing seat and said multi-segment ring, an annular spring surrounding the multi-segment ring and urging the segments thereof radially inwardly against the ball to retain the ball against said bearing seat, and an annular spring surrounding said first spring and reacting axially of the joint between the socket and the packing to tighten the latter.

11. In a pipe joint of the ball and socket type, a retaining ring adapted to be removably secured to the socket to retain the ball and socket in assembled relation, said retaining ring having an aperture of sufficient diameter to pass the ball, and a multi-part ball seating ring of smaller diameter than that of the ball removably nested in the retaining ring.

12. In a pipe joint of the ball and socket type, a retaining ring adapted to be removably secured to the socket to retain the ball and socket in assembled relation, said retaining ring having an aperture of sufficient diameter to pass the ball, multi-part ball seating ring of smaller diameter than that of the ball removably nested in the retaining ring, and an abutment projecting radially inwardly of the retaining ring between adjacent parts of the seating ring to thereby prevent rotation of the seating ring in the retaining ring.

13. In a pipe joint of the ball and socket type, a retaining ring adapted to be removably secured to the socket to retain the ball and socket in assembled relation, said retaining ring having an aperture of sufficient diameter to pass the ball, a multi-part ball seating ring of smaller diameter than that of the ball removably nested in the retaining ring, the retaining ring having a generally radially extended aperture therethrough, and an abutment member in said aperture and projecting radially inwardly between adjacent parts of the seating ring to thereby prevent rotation of the seating ring in the retaining ring.

14. A ball member for use in a ball and socket pipe joint, said ball member having a hollow shank one end of which is adapted to be connected into a pipe line and having a generally spherical, open-ended, hollow ball portion at the other end of the shank adapted to be seated against a bearing seating ring, the wall of the ball portion adjacent the shank in the region of its seating surface being of greater thickness than the wall at the open end of the ball whereby to provide for machining to undersize upon development of wear distorting the spherical shape thereof.

RAYMOND P. DELANO, Jr.
ROBERT W. GREGSON.

REFERENCES CITED

The following references are of record in the file of this patent:

UNITED STATES PATENTS

| Number | Name | Date |
|---|---|---|
| 916,301 | Greenlaw | Mar. 23, 1909 |
| 1,297,370 | Loomis | Mar. 18, 1919 |
| 1,543,348 | Venton | June 23, 1925 |

FOREIGN PATENTS

| Number | Country | Date |
|---|---|---|
| 564,547 | Germany | Nov. 3, 1932 |